(12) United States Patent
Si

(10) Patent No.: US 12,484,171 B2
(45) Date of Patent: Nov. 25, 2025

(54) HINGE OF FLEXIBLE SCREEN MOBILE TERMINAL

(71) Applicant: Amphenol Phoenix (Anji) Telecom Parts Co., Ltd., Zhejiang (CN)

(72) Inventor: Mengyu Si, Anji county, Zhejiang Province (CN)

(73) Assignee: Amphenol Phoenix (Anji) Telecom Parts Co., Ltd., Zhejiang (CN)

( * ) Notice: Subject to any disclaimer, the term of this patent is extended or adjusted under 35 U.S.C. 154(b) by 0 days.

(21) Appl. No.: 19/102,730

(22) PCT Filed: Jul. 31, 2023

(86) PCT No.: PCT/CN2023/110226
§ 371 (c)(1),
(2) Date: Feb. 10, 2025

(87) PCT Pub. No.: WO2024/032408
PCT Pub. Date: Feb. 15, 2024

(65) Prior Publication Data
US 2025/0267807 A1    Aug. 21, 2025

(30) Foreign Application Priority Data
Aug. 8, 2022   (CN) .......................... 202210942341.5

(51) Int. Cl.
  *H05K 5/00*     (2025.01)
  *H05K 5/02*     (2006.01)
(52) U.S. Cl.
  CPC .................. *H05K 5/0226* (2013.01)

(58) Field of Classification Search
None
See application file for complete search history.

(56) References Cited

U.S. PATENT DOCUMENTS 11,917,780 B2 *  2/2024  Caplow-Munro ... H05K 5/0226

FOREIGN PATENT DOCUMENTS

| CN | 206282175 U | 6/2017 |
|---|---|---|
| CN | 210578705 U | 5/2020 |

(Continued)

*Primary Examiner* — Imani N Hayman
*Assistant Examiner* — Rashen E Morrison
(74) *Attorney, Agent, or Firm* — MUNCY, GEISSLER, OLDS & LOWE, P.C.

(57) ABSTRACT

A hinge of flexible screen mobile terminal includes a central support frame, left and right support arms, and left and right screen support mechanisms. The central support frame includes a fixed frame and left and right switching connection structures located on either side of the fixed frame, with the left and right support arms rotatably connected to the fixed frame. The left and right screen support mechanisms are respectively rotatably connected to the left and right switching connection structures, and the hinge switches control structures for the left and right switching connection structures. The hinge structure allows transitions from inward folding to unfolding, flattening, and continuing rotation to outward folding, as well as from outward folding to unfolding, flattening, and continuing rotation to inward folding. The overall motion range can be 360° or an angle less than 360° (e.g., 300°), meeting the motion requirements of flip-type flexible screen mobile terminals.

9 Claims, 5 Drawing Sheets

(56) References Cited

FOREIGN PATENT DOCUMENTS

| | | | | |
|---|---|---|---|---|
| CN | 112384876 A | * | 2/2021 | ........... G06F 1/1681 |
| CN | 112855743 A | | 5/2021 | |
| CN | 218941130 U | | 4/2023 | |
| KR | 20200128330 A | | 11/2020 | |

* cited by examiner

HINGE OF FLEXIBLE SCREEN MOBILE TERMINAL

TECHNICAL FIELD

The present invention relates to flexible screen mobile terminals, particularly to a hinge for flip-type flexible screen mobile terminals.

BACKGROUND TECHNOLOGY

For foldable flexible screen mobile terminals, there are two types: inward-folding flexible screen mobile terminals and outward-folding flexible screen mobile terminals. In outward-folding flexible screen mobile terminals, the flexible screen is positioned on the outer side when the terminal is folded. In inward-folding flexible screen mobile terminals, the flexible screen is positioned on the inner side when the terminal is folded. The left and right housings of both inward-folding and outward-folding flexible screen mobile terminals are connected by a hinge, enabling the flexible screen to be folded and flattened (180°). However, after being flattened, the screen cannot continue to rotate in the reverse folding direction.

SUMMARY OF THE PRESENT INVENTION

The objective of the present invention is to provide a hinge of flexible screen mobile terminal, wherein the hinge structure can be applied to flip-type flexible screen mobile terminals capable of rotation beyond 180°. To achieve this, the present invention adopts the following technical solution:

Hinge of flexible screen mobile terminal, comprising a central support frame, left and right support arms, wherein the central support frame is provided with a screen support structure: characterized in that the central support frame includes a fixed frame and left and right switching connection structures positioned on either side of the fixed frame, with the left and right support arms rotatably connected to the fixed frame:

the hinge is equipped with left and right screen support mechanisms, which are respectively rotatably connected to the left and right switching connection structures: the hinge is configured with switching control structures for the left and right switching connection structures: within the inward folding motion range, the left and right switching connection structures are fixed to the fixed frame to form a rigid structure: within the outward folding motion range, the left and right switching connection structures are fixed to the left and right screen support mechanisms, respectively, so that the left switching connection structure and the left screen support mechanism form a rigid structure, the right switching connection structure and the right screen support mechanism form a rigid structure;

the left and right screen support mechanisms are provided with screen support structures;

the hinge is further provided with a left motion control block and a right motion control block, wherein the left motion control block and the right motion control block are respectively slidably connected to the left and right support arms, the left motion control block and the right motion control block are respectively equipped with control structures, and are respectively connected to the left screen support mechanism and the right screen support mechanism through the control structures to control the rotation of the left screen support mechanism and the right screen support mechanism within the outward folding motion range and the inward folding motion range;

the hinge is further provided with a left rotational linkage and a right rotational linkage, wherein one end of the left rotational linkage and the right rotational linkage is respectively rotatably connected to the left and right sides of the fixed frame, and the other end is respectively rotatably connected to the left motion control block and the right motion control block to control the sliding of the left motion control block and the right motion control block, respectively.

Based on the above technical solution, the present invention may further adopt the following additional technical solutions, or a combination of these additional technical solutions:

The left switching connection structure is positioned between the fixed frame and the left screen support mechanism, and the right switching connection structure is positioned between the fixed frame and the right screen support mechanism; the screen support structure provided on the central support frame includes a portion located on the fixed frame and portions located on the left switching connection structure and the right switching connection structure; in the outward folding closed state, the screen support structures on the left switching connection structure and the right switching connection structure, together with the screen support structure on the fixed frame, form an arc-shaped support structure for the flexible screen; in the flattened state of the flexible screen mobile terminal, the screen support structures on the left switching connection structure and the right switching connection structure, together with the screen support structure on the fixed frame and the screen support structures on the left screen support mechanism and the right screen support mechanism, form a support structure for the flattened flexible screen.

The switching structure includes clutch members slidably connected to the switching connection structure, wherein a cam structure configured between the left screen support mechanism and the fixed frame is used to control the clutch member on the left side, and a cam structure configured between the right screen support mechanism and the fixed frame is used to control the clutch member on the right side, such that within the inward folding motion range, the clutch members connect the left switching connection structure to the fixed frame and the right switching connection structure to the fixed frame, thereby forming a rigid structure between the left switching connection structure and the fixed frame as well as the right switching connection structure; and such that within the outward folding motion range, the clutch members instead connect the left switching connection structure to the left screen support mechanism and the right switching connection structure to the right screen support mechanism, thereby forming a rigid structure between the left switching connection structure and the left screen support mechanism as well as the right switching connection structure and the right screen support mechanism.

Within the flattened and outward folding motion ranges of the flexible screen mobile terminal, the left motion control block and the right motion control block respectively provide support for the left screen support mechanism and the right screen support mechanism; the left motion control block and the left screen support mechanism are provided with a sliding guide fit structure, and the right motion control block and the right screen support mechanism are provided with a sliding guide fit structure, such that within the flattened and outward folding motion ranges of the flexible screen mobile terminal, the left motion control block and the left screen support mechanism cooperate in sliding guide support, and the right motion control block and the right screen support mechanism cooperate in sliding guide support.

The clutch members are sliding pins, wherein the cam structure on the left side includes an arc-shaped surface and a sliding pin connection groove provided on the left screen support mechanism, as well as an arc-shaped surface and a sliding pin connection groove provided on the corresponding side of the fixed frame, and the left switching connection structure is provided with a sliding slot that is slidably connected to the sliding pin; the cam structure on the right side includes an arc-shaped surface and a sliding pin connection groove provided on the right screen support mechanism, as well as an arc-shaped surface and a sliding pin connection groove provided on the corresponding side of the fixed frame, and the right switching connection structure is provided with a sliding slot that is slidably connected to the sliding pin.

A comb-shaped structure is used between the fixed frame and the left switching connection structure, as well as between the fixed frame and the right switching connection structure, allowing mutual insertion and partial overlap.

A synchronous reverse rotation connecting mechanism is provided between the left and right support arms.

The control structure adopts a guide slot, wherein the guide slot includes an inclined section corresponding to the inward folding motion range and a parallel section aligned with the sliding direction of the motion control block where the guide slot is provided, and within the outward folding motion range, the left screen support mechanism and the right screen support mechanism are respectively slidably connected to the parallel section.

The flexible screen mobile terminal is a flip-type flexible screen mobile terminal, wherein the left motion control block and the right motion control block are respectively fixedly connected to the left housing and the right housing of the flexible screen mobile terminal, or respectively form part of the left housing and the right housing of the flexible screen mobile terminal.

The hinge structure of the present invention enables transitions from inward folding to unfolding, flattening, and continuing rotation to outward folding, as well as from outward folding to unfolding, flattening, and continuing rotation to inward folding. The overall range of motion can be 360° or an angle less than 360° (e.g., 300°), thereby meeting the motion requirements of flip-type flexible screen mobile terminals. This allows the flexible screen to flip from the inner side of the mobile terminal to the outer side, and vice versa, from the outer side to the inner side.

DETAILED DESCRIPTION OF THE EMBODIMENTS

Figure 1:
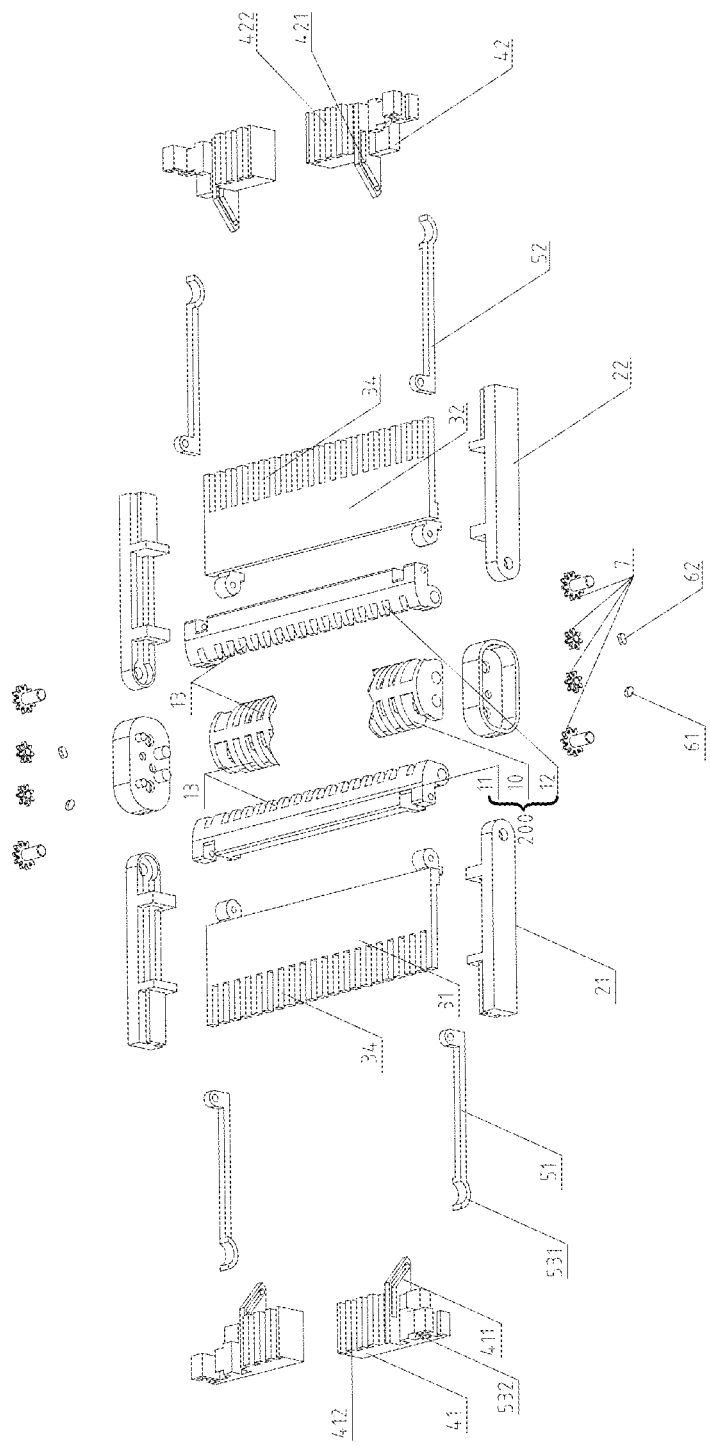
FIG. 1 is an exploded view of the structure of the present invention.
Figure 2:
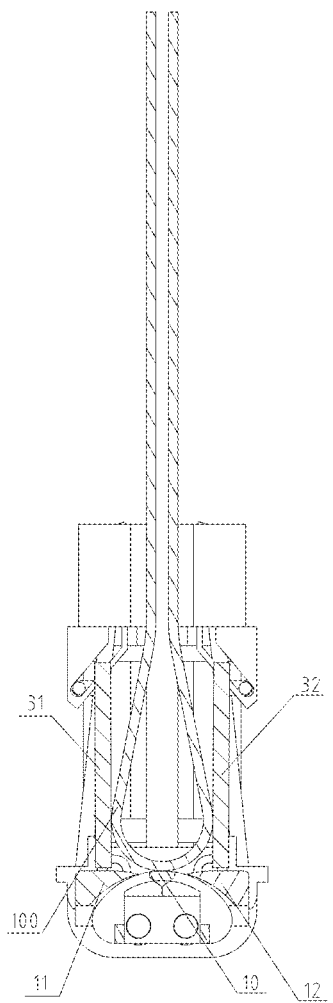
FIG. 2 is a schematic diagram of the hinge of the present invention applied to a flexible screen mobile terminal in the inward-folding closed state.
Figure 3:
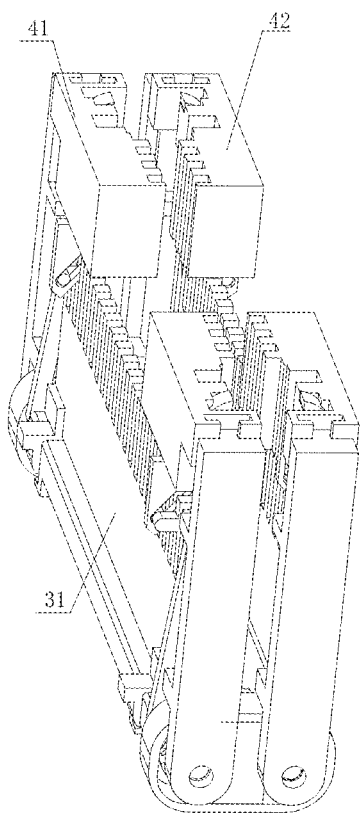
FIG. 3 is a sectional view of the hinge of the present invention applied to a flexible screen mobile terminal in the inward-folding closed state.
Figure 4:
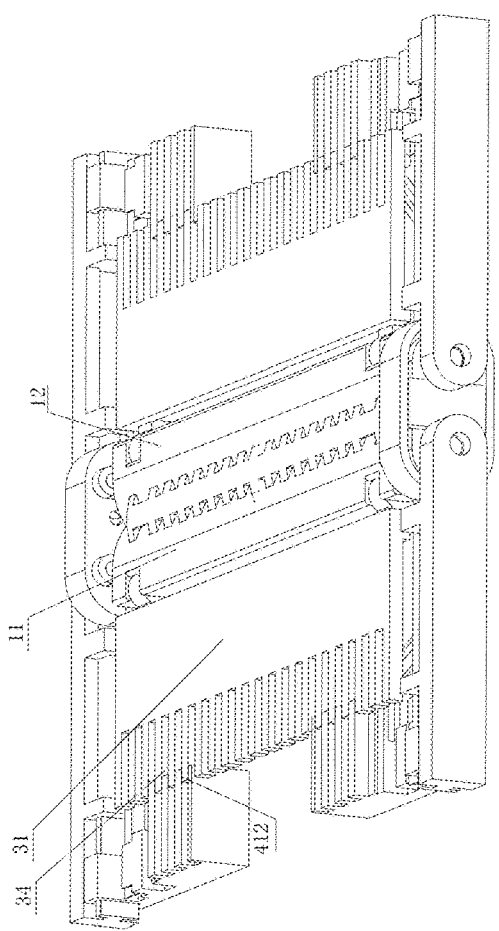
FIG. 4 is a schematic diagram of the hinge of the present invention corresponding to the flattened state of the flexible screen mobile terminal.

Referring to the accompanying drawings, the hinge of flexible screen mobile terminal of the present invention is applied to a flip-type flexible screen mobile terminal, comprising a left housing, a right housing, and a hinge connecting the left and right housings. The flexible screen 100 is laid on one side of the flexible screen mobile terminal. The rotation from the closed state to the flattened state within the first 180° corresponds to the inward-folding opening mode. Beyond 180°, the rotation to the maximum angle (e.g., 360° or an angle less than 360°, such as 300°) corresponds to the outward-folding closing process. Conversely, the outward-folding opening process and the inward-folding closing process occur in the reverse direction.

The hinge comprises a central support frame, left and right support arms 21, 22, wherein the central support frame is provided with a screen support structure. The central support frame includes a fixed frame 10, a left switching connection structure 11 positioned on one side of the fixed frame 10, and a right switching connection structure 12 positioned on the other side of the fixed frame 10. The left support arm 21 and the right support arm 22 are rotatably connected to the fixed frame 10.

The hinge is provided with a left screen support mechanism 31 and a right screen support mechanism 32, wherein the left screen support mechanism 31 and the right screen support mechanism 32 adopt a plate-shaped main body as the screen support structure in this embodiment. Alternatively, they can be configured as rod-shaped base structures with the screen support structure provided on them, as needed.

The left screen support mechanism 31 and the right screen support mechanism 32 are respectively rotatably connected to the left switching connection structure 11 and the right switching connection structure 12. The hinge is configured with switching control structures for the left switching connection structure 11 and the right switching connection structure 12. Within the inward folding motion range, the left switching connection structure 11 and the right switching connection structure 12 are fixed to the fixed frame 10 to form a rigid structure, with their rotational relationships locked to prevent relative rotation. Within the outward folding motion range, the left switching connection structure 11 and the right switching connection structure 12 are fixed respectively to the left screen support mechanism 31 and the right screen support mechanism 32, while the connection between the left switching connection structure 11 and the left screen support mechanism 31 is locked, preventing relative rotation and forming a rigid structure, and the connection between the right switching connection structure 12 and the right screen support mechanism 32 is locked, preventing relative rotation and forming a rigid structure.

The hinge is further provided with a left motion control block 41 and a right motion control block 42, which are slidably connected to the left support arm 21 and the right support arm 22, respectively. As shown in the figure, the sliding direction is perpendicular to the rotational axis of the left support arm 21 and the right support arm 22. The left motion control block 41 and the right motion control block 42 are each equipped with control structures, which are connected to the left screen support mechanism 31 and the right screen support mechanism 32, respectively, through the control structures. These control structures control the rotation of the left screen support mechanism 31 and the right screen support mechanism 32 within the outward folding motion range and the inward folding motion range. The left motion control block 41 and the right motion control block 42 are fixedly connected to the left housing and the right housing of the flexible screen mobile terminal, respectively, or alternatively, they form part of the left housing and the right housing of the flexible screen mobile terminal. The aforementioned control structures and sliding guide structures are integrated within the left housing and the right housing.

The hinge is further provided with a left rotational linkage 51 and a right rotational linkage 52, wherein one end of the left rotational linkage 51 and the right rotational linkage 52 is rotatably connected to the left and right sides of the fixed frame 10, respectively, and the other end is rotatably connected to the left motion control block 41 and the right motion control block 42, respectively, to control the sliding of the left motion control block 41 and the right motion control block 42. Preferably, the left rotational linkage 51 and the right rotational linkage 52 are rotatably connected to the left motion control block 41 and the right motion control block 42, respectively, through an arcuate slider 531 and an arcuate slot 532 rotational connection structure.

Figure 5:
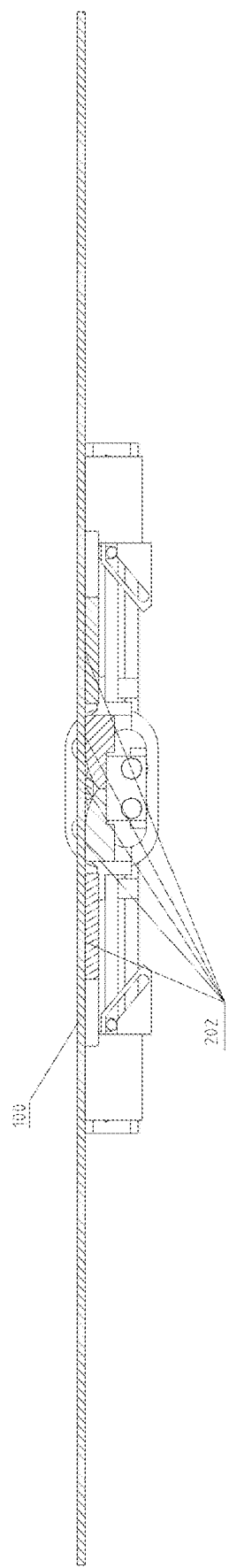
FIG. 5 is a sectional view of the hinge of the present invention corresponding to the flattened state of the flexible screen mobile terminal.
Figure 6:
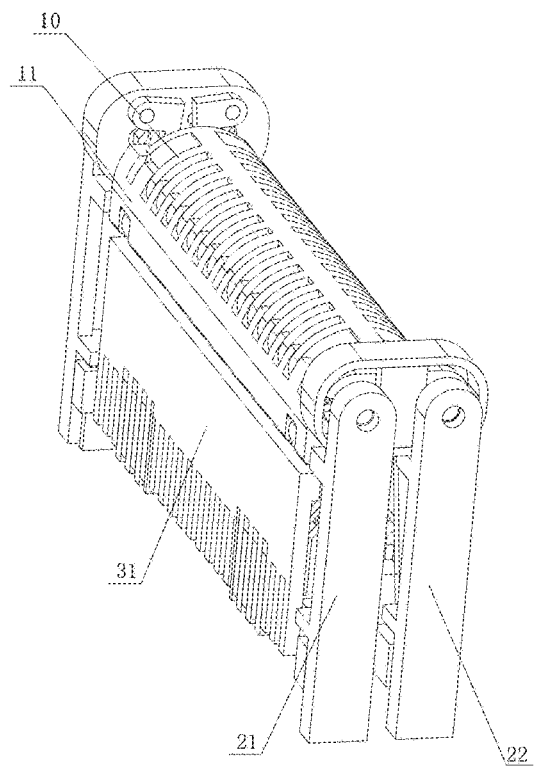
FIG. 6 is a schematic diagram of the hinge of the present invention applied to a flexible screen mobile terminal in the outward-folding closed state.
Figure 7:
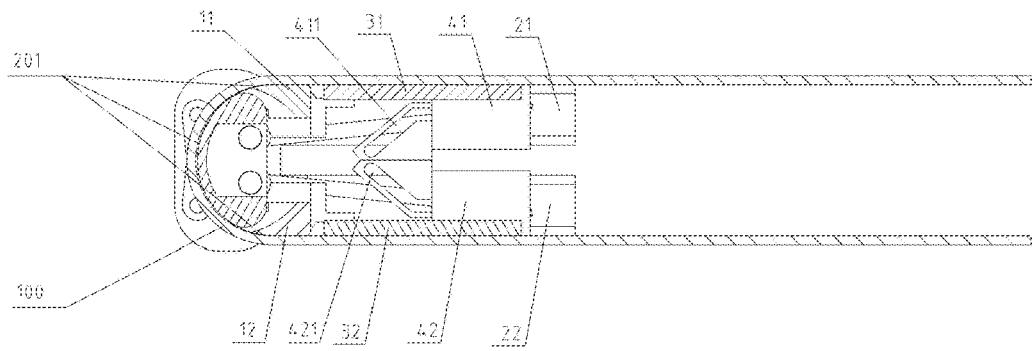
FIG. 7 is a sectional view of the hinge of the present invention applied to a flexible screen mobile terminal in the outward-folding closed state.
Figure 8:
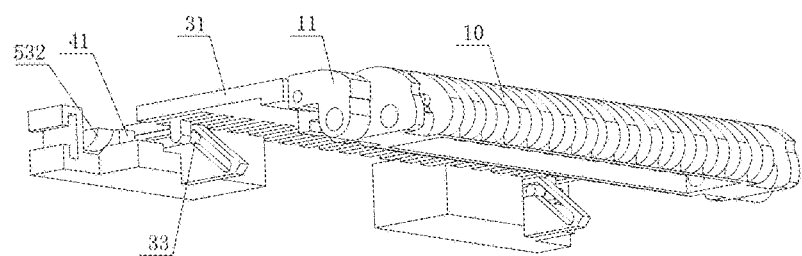
FIG. 8 is a schematic diagram illustrating the fit between the housing connection block and the screen support member in the embodiment of the present invention.

The screen support structure provided on the central support frame includes a portion located on the fixed frame 10 and portions located on the left switching connection structure 11 and the right switching connection structure 12. This can be the surface of the fixed frame 10, the left switching connection structure 11, and the right switching connection structure, or support components provided on the corresponding parts. The left switching connection structure 11 is positioned between the fixed frame 10 and the left screen support mechanism 31, while the right switching connection structure 12 is positioned between the fixed frame 10 and the right screen support mechanism 32, forming a chain-like structure with switchable connection relationships. Referring to FIG. 7, in the outward folding closed state, the screen support structures on the left switching connection structure 11 and the right switching connection structure 12, together with the screen support structure on the fixed frame 10, form an arc-shaped support structure 201 for the curved portion of the flexible screen. Referring to FIG. 5, in the flattened state of the flexible screen mobile terminal, the screen support structures on the left switching connection structure 11 and the right switching connection structure 12, along with the screen support structure on the fixed frame 10 and the screen support structures on the left screen support mechanism 31 and the right screen support mechanism 32, collectively form a support structure 202 for the flattened flexible screen.

Figure 9:
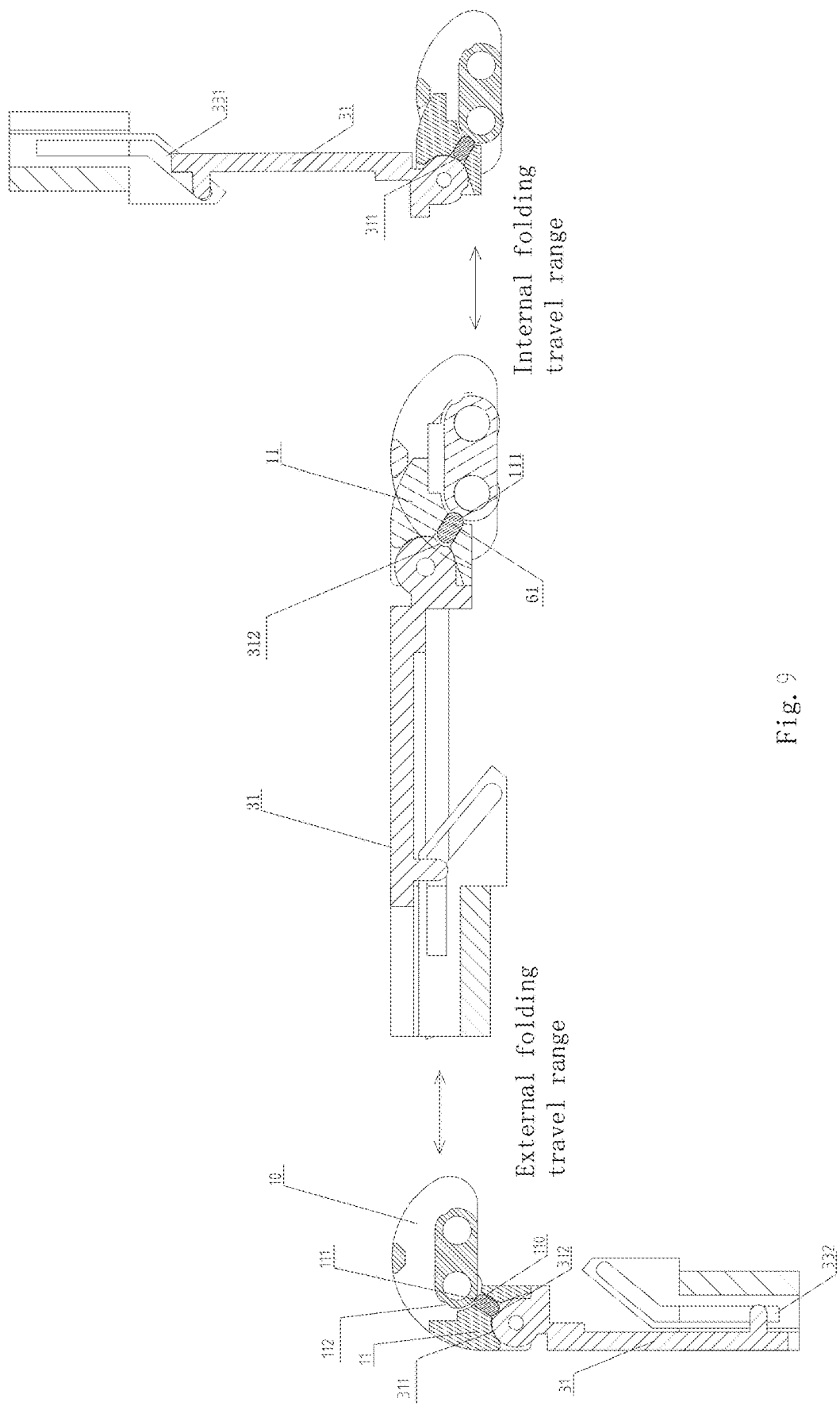
FIG. 9 is a schematic diagram illustrating the fit changes between the switching support member, the screen support member, and the central support frame during state transitions among inward-folding closed, flattened, and outward-folding closed states in the embodiment of the present invention.

The fixed frame 10 and the left switching connection structure 11, as well as the fixed frame 10 and the right switching connection structure 12, can adopt a comb-shaped structure 13 for mutual insertion and partial overlap. A rotational limiting structure can be provided between them. The switching structure can adopt a clutch-type switching structure, including clutch members 61 and 62 slidably connected to the switching connection structures 11 and 12. A cam structure configured between the left screen support mechanism 31 and the fixed frame 10 is used to control the clutch member 61 on the left side, while a cam structure configured between the right screen support mechanism 32 and the fixed frame 10 is used to control the clutch member 62 on the right side. Within the inward folding motion range, as shown in FIG. 9, the clutch member 61 connects the left switching connection structure 11 to the fixed frame 10, and the clutch member 62 connects the right switching connection structure 12 to the fixed frame 10. This forms rigid structures between the left switching connection structure 11 and the fixed frame 10, as well as between the right switching connection structure 12 and the fixed frame 10. Simultaneously, the clutch member 61 disengages from the left screen support mechanism 31, and the clutch member 62 disengages from the right screen support mechanism 32, allowing the left screen support mechanism 31 and the right screen support mechanism 32 to rotate relative to the left switching connection structure 11 and the right switching connection structure 12, respectively. Within the outward folding motion range, the clutch members 61 and 62 instead connect the left switching connection structure 11 to the left screen support mechanism 31, and the right switching connection structure 12 to the right screen support mechanism 32. This forms rigid structures between the left switching connection structure 11 and the left screen support mechanism 31, as well as between the right switching connection structure 12 and the right screen support mechanism 32, allowing them to rotate as rigid units relative to the fixed frame 10.

The clutch members 61 and 62 can be implemented as sliding components, such as sliding pins. The cam structure on the left side includes an arc-shaped surface 311 and a sliding pin connection groove 312 provided on the left screen support mechanism 31, as well as an arc-shaped surface 111 and a sliding pin connection groove 112 provided on the corresponding side of the fixed frame 10. The left switching connection structure 11 is provided with a sliding slot 110 that is slidably connected to the sliding pin 61. Similarly, the cam structure on the right side includes an arc-shaped surface and a sliding pin connection groove provided on the right screen support mechanism 32, as well as an arc-shaped surface and a sliding pin connection groove provided on the corresponding side of the fixed frame 10. The right switching connection structure 12 is provided with a sliding slot that is slidably connected to the sliding pin 62. Thus, the above-mentioned connection switching is achieved through sliding. Specifically, under the control of the cam structure, the sliding pin connects only its end to one groove during the hinge's motion. During the inward folding and outward folding motion ranges, the sliding pin connects different ends to different grooves, enabling the switching of connections as required.

The control structures on the left motion control block 41 and the right motion control block 42 can be implemented as guide slots 411 and 421, respectively, with corresponding guide pins 33 provided on the left screen support mechanism 31 and the right screen support mechanism 32 for cooperative connection. The guide slots 411 and 421 include an inclined segment 331 (which can be either straight or curved), corresponding to the inward folding motion range, and a parallel segment 332, aligned with the sliding direction of the left or right motion control block 41 or 42 (The sliding direction of the left motion control block 41 and the right motion control block 42 is relative to the left support arm 21 and the right support arm 22, respectively.) where the guide slots 411 and 421 are provided. Within the outward folding motion range, both the left screen support mechanism 31 and the right screen support mechanism 32 are slidably connected to the parallel segment 332 of the guide slots.

In a preferred embodiment, within the flattened state and the outward folding motion range of the flexible screen mobile terminal, the left motion control block 41 and the right motion control block 42 respectively provide support for the left screen support mechanism 31 and the right screen support mechanism 32. Preferably, a sliding guide fit structure is provided between the left motion control block 41 and the left screen support mechanism 31, as well as between the right motion control block 42 and the right screen support mechanism 32. This ensures that within the flattened state and the outward folding motion range of the flexible screen mobile terminal, the left motion control block 41 and the left screen support mechanism 31 cooperate in sliding guide support, and the right motion control block 42 and the right screen support mechanism 32 cooperate in sliding guide support. The sliding guide fit structure may adopt comb-shaped slots 412 and 422 provided on the left motion control block 41 and the right motion control block 42, respectively; while corresponding comb-shaped structures 34 are provided on the left screen support mechanism 31 and the right screen support mechanism 32 for cooperative connection.

A synchronous reverse rotation connecting mechanism is provided between the left support arm 21 and the right support arm 22 to enable synchronous reverse rotation of the two arms. The synchronous reverse rotation connecting mechanism can adopt a gear structure 6, wherein gears in the gear structure 7 can be installed on the rotational axes of the left support arm 21 and the right support arm 22.

The above description is merely specific embodiments of the present invention, and the structural features of the invention are not limited thereto. Any modifications or changes made by those skilled in the art within the scope of the invention are encompassed within the protection scope of the present invention.

It should be noted that the terms "comprise," "include," "have," and their variations in the description, claims, and drawings of the present invention are intended to cover non-exclusive inclusions. The terms "install," "provide," "configured with," "connect," "link," and "engage" should be understood in a broad sense. For example, they may refer to fixed connections, detachable connections, or integral structures; mechanical or electrical connections; direct connections or indirect connections through intermediate media; or internal communication between two devices, components, or parts. A person skilled in the art can interpret these terms in the specific context of the invention.

In the description of the present invention, it should be understood that terms such as "one end," "the other end," "outer side," "inner side," "horizontal," "end portion," "length," "outer end," "left," "right," etc., indicating directions or positional relationships, are based on the directions or positions shown in the drawings. These terms are intended solely for ease of describing the invention and simplifying the description, and are not intended to imply that the referred device or component must have a specific orientation, configuration, or operation in such a direction. Therefore, they should not be interpreted as limitations to the invention. Terms such as "first" and "second" are used merely for clarity and do not indicate or imply relative importance.

Moreover, when practicing the claims of the present invention, a person skilled in the art, through the study of the drawings, disclosures, and appended claims, may understand and implement variations of the disclosed embodiments. Furthermore, terms such as "comprise" and "contain" in the claims and description do not exclude other elements or steps, and singular nouns do not exclude their plural forms.

The invention claimed is:

1. A hinge of flexible screen mobile terminal, comprising a central support frame, left and right support arms, wherein the central support frame is provided with a screen support structure; wherein the central support frame includes a fixed frame and left and right switching connection structures positioned on either side of the fixed frame, with the left and right support arms rotatably connected to the fixed frame;

wherein the hinge is equipped with left and right screen support mechanisms, which are respectively rotatably and directly connected to the left and right switching connection structures; within an inward folding motion range, the left and right switching connection structures are fixed to the fixed frame; within an outward folding motion range, the left and right switching connection structures are fixed to the left and right screen support mechanisms, respectively;

wherein the left and right screen support mechanisms are provided with screen support structures;

wherein the hinge is further provided with a left motion control block and a right motion control block, wherein the left motion control block and the right motion control block are respectively slidably connected to the left and right support arms, the left motion control block and the right motion control block are respectively equipped with guide slots, and are respectively slidably connected to the left screen support mechanism and the right screen support mechanism through the guide slots to control the rotation of the left screen support mechanism and the right screen support mechanism within the outward folding motion range and the inward folding motion range;

wherein the hinge is further provided with a left rotational linkage and a right rotational linkage, wherein one end of the left rotational linkage and the right rotational linkage is respectively rotatably connected to the left and right sides of the fixed frame, and the other end is respectively rotatably connected to the left motion control block and the right motion control block to control the sliding of the left motion control block and the right motion control block, respectively.

2. The hinge of flexible screen mobile terminal as described in claim 1, wherein the left switching connection structure is positioned between the fixed frame and the left screen support mechanism, and the right switching connection structure is positioned between the fixed frame and the right screen support mechanism; the screen support structure provided on the central support frame includes a portion located on the fixed frame and portions located on the left switching connection structure and the right switching connection structure; in the outward folding closed state, the screen support structures on the left switching connection structure and the right switching connection structure, together with the screen support structure on the fixed frame, form an arc-shaped support structure for the flexible screen; in the flattened state of the flexible screen mobile terminal, the screen support structures on the left switching connection structure and the right switching connection structure, together with the screen support structure on the fixed frame and the screen support structures on the left screen support mechanism and the right screen support mechanism, form a support structure for the flattened flexible screen.

3. The hinge of flexible screen mobile terminal as described in claim 1, wherein the switching structure includes clutch members slidably connected to the switching connection structure, wherein a cam structure configured between the left screen support mechanism and the fixed frame is used to control the clutch member on the left side, and a cam structure configured between the right screen support mechanism and the fixed frame is used to control the clutch member on the right side, such that within the inward folding motion range, the clutch members connect the left switching connection structure to the fixed frame and the right switching connection structure to the fixed frame; and such that within the outward folding motion range, the clutch members instead connect the left switching connection structure to the left screen support mechanism and the right switching connection structure to the right screen support mechanism.

4. The hinge of flexible screen mobile terminal as described in claim 1, wherein within the flattened and outward folding motion ranges of the flexible screen mobile terminal, the left motion control block and the right motion control block respectively provide support for the left screen support mechanism and the right screen support mechanism; the left motion control block and the left screen support mechanism are provided with a sliding guide fit structure, and the right motion control block and the right screen support mechanism are provided with a sliding guide fit structure, such that within the flattened and outward folding motion ranges of the flexible screen mobile terminal, the left motion control block and the left screen support mechanism cooperate in sliding guide support, and the right motion control block and the right screen support mechanism cooperate in sliding guide support.

5. The hinge of flexible screen mobile terminal as described in claim 3, wherein the clutch members are sliding pins, wherein the cam structure on the left side includes an arc-shaped surface and a sliding pin connection groove provided on the left screen support mechanism, as well as an arc-shaped surface and a sliding pin connection groove provided on the corresponding side of the fixed frame, and the left switching connection structure is provided with a sliding slot that is slidably connected to the sliding pin; the cam structure on the right side includes an arc-shaped surface and a sliding pin connection groove provided on the right screen support mechanism, as well as an arc-shaped surface and a sliding pin connection groove provided on the corresponding side of the fixed frame, and the right switching connection structure is provided with a sliding slot that is slidably connected to the sliding pin.

6. The hinge of flexible screen mobile terminal as described in claim 1, wherein a comb-shaped structure is used between the fixed frame and the left switching connection structure, as well as between the fixed frame and the right switching connection structure, allowing mutual insertion and partial overlap.

7. The hinge of flexible screen mobile terminal as described in claim 1, wherein a synchronous reverse rotation connecting mechanism is provided between the left and right support arms.

8. The hinge of flexible screen mobile terminal as described in claim 1, wherein the guide slot includes an inclined section corresponding to the inward folding motion range and a parallel section aligned with the sliding direction of the motion control block where the guide slot is provided, and within the outward folding motion range, the left screen support mechanism and the right screen support mechanism are respectively slidably connected to the parallel section.

9. The hinge of flexible screen mobile terminal as described in claim 1, wherein the flexible screen mobile terminal is a flip-type flexible screen mobile terminal, wherein the left motion control block and the right motion control block are respectively fixedly connected to the left housing and the right housing of the flexible screen mobile terminal, or respectively form part of the left housing and the right housing of the flexible screen mobile terminal.

* * * * *